(12) United States Patent
Avrahami et al.

(10) Patent No.: US 9,892,278 B2
(45) Date of Patent: Feb. 13, 2018

(54) FOCUSED PERSONAL IDENTIFYING INFORMATION REDACTION

(71) Applicant: International Business Machines Corporation, Armonk, NY (US)

(72) Inventors: Shlomit Avrahami, Jerusalem (IL); Joshua Fox, Emek Haela (IL); Yuri Kosharovsky, Giv'at Ze'ev (IL); Michael Pelts, Tzur Hadasa (IL)

(73) Assignee: International Business Machines Corporation, Armonk, NY (US)

(*) Notice: Subject to any disclaimer, the term of this patent is extended or adjusted under 35 U.S.C. 154(b) by 346 days.

(21) Appl. No.: 13/676,712

(22) Filed: Nov. 14, 2012

(65) Prior Publication Data
US 2014/0136941 A1 May 15, 2014

(51) Int. Cl.
*G06F 17/00* (2006.01)
*G06F 21/62* (2013.01)

(52) U.S. Cl.
CPC ...... *G06F 21/6245* (2013.01); *G06F 21/6254* (2013.01); *G06F 2221/2117* (2013.01)

(58) Field of Classification Search
None
See application file for complete search history.

(56) References Cited

U.S. PATENT DOCUMENTS

| | | | |
|---|---|---|---|
| 5,619,648 A | 4/1997 | Canale | |
| 5,664,109 A | 9/1997 | Johnson | |
| 5,940,843 A | 8/1999 | Zucknovich | |
| 5,960,080 A | 9/1999 | Fahlman et al. | |
| 6,052,682 A | 4/2000 | Miller | |
| 6,115,704 A | 9/2000 | Olson et al. | |
| 6,161,084 A | 12/2000 | Messerly | |
| 6,178,439 B1 | 1/2001 | Feit | |
| 6,226,635 B1 | 5/2001 | Katariya | |
| 6,330,610 B1 | 12/2001 | Docter | |
| 6,336,117 B1 | 1/2002 | Massarani | |
| 6,453,327 B1 | 9/2002 | Nielsen | |
| 6,539,371 B1 | 3/2003 | Bleizeffer | |
| 6,640,010 B2 | 10/2003 | Seeger | |
| 6,820,082 B1 | 11/2004 | Cook | |
| 6,820,237 B1 | 11/2004 | Abu-Hakima | |
| 6,879,977 B2 | 4/2005 | Huffman | |
| 6,928,618 B2 | 8/2005 | Kohls | |

(Continued)

FOREIGN PATENT DOCUMENTS

| | | |
|---|---|---|
| EP | 1077421 A2 | 2/2001 |
| EP | 1638032 | 3/2006 |

(Continued)

OTHER PUBLICATIONS

Bier, Eric, et al., "The Rules of redaction: identify, protect, review (and repeat)," Palo Alto Research Center, 2009 IEEE.

(Continued)

*Primary Examiner* — Keith Bloomquist
(74) *Attorney, Agent, or Firm* — David W. Victor; Konrad, Raynes, Davda and Victor LLP

(57) ABSTRACT

Personal information is retrieved from at least one data source and personal information associated with a first individual is identified. A document is generated that is a version of a first document, wherein the personal information associated with the first individual cannot be discerned.

15 Claims, 5 Drawing Sheets

(56) References Cited

U.S. PATENT DOCUMENTS

| | | |
|---|---|---|
| 6,931,403 B1 | 8/2005 | Agrawal |
| 6,952,720 B2 | 10/2005 | Guedalia |
| 7,028,049 B1 | 4/2006 | Shelton |
| 7,181,495 B2 | 2/2007 | Skladman |
| 7,194,693 B2 | 3/2007 | Cragun |
| 7,206,814 B2 | 4/2007 | Kirsch |
| 7,243,097 B1 | 7/2007 | Agrawal |
| 7,293,017 B2 | 11/2007 | Hurst-hiller |
| 7,316,032 B2 | 1/2008 | Tayebi |
| 7,412,605 B2 | 8/2008 | Raley |
| 7,523,135 B2 | 4/2009 | Bradford |
| 7,660,798 B1 | 2/2010 | Ludwig et al. |
| 7,730,010 B2 | 6/2010 | Kishore |
| 7,748,027 B2 | 6/2010 | Patrick |
| 7,752,566 B1 | 7/2010 | Nelson |
| 7,802,305 B1* | 9/2010 | Leeds .................. 715/271 |
| 7,805,673 B2 | 9/2010 | der Quaeler |
| 7,873,838 B2 | 1/2011 | Staddon |
| 9,195,853 B2 | 11/2015 | Fox et al. |
| 9,224,007 B2 | 12/2015 | Fox et al. |
| 2002/0165021 A1 | 11/2002 | Several |
| 2002/0165201 A1 | 11/2002 | Binderup et al. |
| 2004/0054918 A1 | 3/2004 | Duri |
| 2004/0061716 A1 | 4/2004 | Cheung |
| 2004/0073461 A1 | 4/2004 | Pappas |
| 2004/0139043 A1 | 7/2004 | Lei |
| 2004/0240735 A1 | 12/2004 | Medina |
| 2005/0140572 A1 | 6/2005 | Kahan |
| 2005/0283471 A1 | 12/2005 | Ahmed |
| 2006/0026159 A1 | 2/2006 | Dettinger |
| 2006/0031301 A1 | 2/2006 | Herz |
| 2006/0053097 A1 | 3/2006 | King |
| 2006/0136985 A1 | 6/2006 | Ashley |
| 2006/0156222 A1 | 7/2006 | Chi |
| 2006/0259954 A1 | 11/2006 | Patrick |
| 2006/0259977 A1 | 11/2006 | Patrick |
| 2007/0030528 A1 | 2/2007 | Quaeler et al. |
| 2007/0094284 A1 | 4/2007 | Bradford |
| 2007/0094594 A1 | 4/2007 | Matichuk |
| 2007/0118534 A1 | 5/2007 | Hayes et al. |
| 2007/0192122 A1* | 8/2007 | Routson ............ G06Q 50/265 705/1.1 |
| 2007/0192734 A1 | 8/2007 | Berstis |
| 2007/0203776 A1 | 8/2007 | Austln |
| 2007/0239653 A1 | 10/2007 | Kiehn |
| 2007/0255704 A1 | 11/2007 | Baek |
| 2007/0266079 A1* | 11/2007 | Criddle ............ G06Q 10/107 709/203 |
| 2007/0271212 A1 | 11/2007 | Jones |
| 2007/0274478 A1 | 11/2007 | Crawford, III |
| 2007/0276649 A1 | 11/2007 | Schubert |
| 2008/0016341 A1 | 1/2008 | Staddon et al. |
| 2008/0016372 A1 | 1/2008 | Staddon et al. |
| 2008/0046757 A1 | 2/2008 | Staddon et al. |
| 2008/0052759 A1 | 2/2008 | Kronlund |
| 2008/0072290 A1 | 3/2008 | Metzer |
| 2008/0204788 A1 | 8/2008 | Kelly |
| 2008/0250021 A1 | 10/2008 | Boys |
| 2008/0320604 A1 | 12/2008 | Nakajima |
| 2009/0037222 A1 | 2/2009 | Kuo |
| 2009/0089663 A1 | 4/2009 | Rebstock et al. |
| 2009/0094675 A1 | 4/2009 | Powers et al. |
| 2009/0132419 A1 | 5/2009 | Grammer |
| 2009/0164878 A1 | 6/2009 | Cottrille |
| 2009/0164881 A1 | 6/2009 | Segarra |
| 2009/0192941 A1 | 7/2009 | Fournier |
| 2009/0198697 A1 | 8/2009 | Bilger et al. |
| 2009/0276701 A1 | 11/2009 | Nurmi |
| 2009/0296166 A1 | 12/2009 | Schrichte |
| 2009/0299853 A1 | 12/2009 | Jones |
| 2009/0323087 A1 | 12/2009 | Luo |
| 2010/0010912 A1 | 1/2010 | Jones |
| 2010/0046015 A1 | 2/2010 | Whittle |
| 2010/0070396 A1 | 3/2010 | Schrichte |
| 2010/0082652 A1* | 4/2010 | Jones ................ G06Q 30/02 707/758 |
| 2010/0229246 A1 | 9/2010 | Warrington |
| 2010/0241844 A1 | 9/2010 | Hussain |
| 2011/0055932 A1 | 3/2011 | Fox |
| 2011/0066606 A1 | 3/2011 | Fox |
| 2011/0119361 A1 | 5/2011 | Issa et al. |
| 2011/0119576 A1 | 5/2011 | Aumann |
| 2011/0162084 A1 | 6/2011 | Fox et al. |
| 2011/0179352 A1 | 7/2011 | Treadwell et al. |
| 2011/0239113 A1 | 9/2011 | Hung |
| 2011/0247081 A1 | 10/2011 | Shelton |
| 2012/0159296 A1 | 6/2012 | Rebstock et al. |
| 2012/0192066 A1 | 7/2012 | Fox et al. |
| 2012/0239380 A1 | 9/2012 | Cumby et al. |
| 2012/0304304 A1 | 11/2012 | Avrahami et al. |
| 2013/0117802 A1 | 5/2013 | Fendt |
| 2013/0144901 A1 | 6/2013 | Ho et al. |
| 2013/0151346 A1 | 6/2013 | Schoen |
| 2013/0185634 A1 | 7/2013 | Fox et al. |
| 2014/0129936 A1 | 5/2014 | Richards et al. |

FOREIGN PATENT DOCUMENTS

| | | |
|---|---|---|
| EP | 1818807 | 8/2007 |
| EP | 2375353 A1 | 10/2011 |
| JP | 2004252773 | 9/2004 |
| WO | WO2006041318 A1 | 4/2006 |
| WO | 2006104810 A3 | 10/2006 |
| WO | WO2006104810 A2 | 10/2006 |
| WO | WO2006104810 A3 | 10/2006 |
| WO | WO2007044970 A2 | 4/2007 |
| WO | WO2008005017 A1 | 1/2008 |
| WO | WO2008122825 A1 | 10/2008 |

OTHER PUBLICATIONS

Damiani, Ernesto et al., "A Fine-Grained Access Control System for XML Documents," SCM Transactions on Information and System Security, vol. 5, No. 2, May 2002, pp. 169-202.

Deguillaume, Frederic, et al., Computer Science Department, CUI—University of Geneva, 24, rue du G'en'eral Dufour, CH-1211 Geneva 4, Switzerland, "Protocols for data-hiding based text document security and automatic processing," IEEE Xplore.

Document Technology Systems Redaction Overview, Document Technology Systems, 525 Portage Trail Extension West, Cuyahoga Falls, OH 44223, http://dts-doc.com/dtswebsite/Documents/DTS%20Redaction%20Overview.pdf.

Google Hacking, WIkipedia, the Free Encyclopedia, (retrieved Jun. 16, 2010), http://en.wikipedia.org/wiki/Google_hacking.

IBM, "Privacy for Instant-Message or Email Popups", IP.Com, Mar. 16, 2009, https://priorart.ip.com/download/IPCOM000180738D/IPCOM000180738D.pdf.

IBM, "InfoSphere Guardium Data Redaction", Solution Brief, IBM Software, Jul. 2012.

Intellidact Intelligent Redaction Software, Computing System Innovations, 791 Piedmont Wekiwa Road, Apopka, FL 32703, http://www.csisoft.com/applications/Intellidact_flyer.pdf.

Kazem Taghva, et al., Information Science Research Institute University of Nevada, Las Vegas, "Identification and Redaction of Privacy Information in Scanned Documents," The 5th International Conference on Information Technology and Applications (ICITA 2008).

Porat, Sara et al., "Masking gateway for enterprises," IBM Haifa Research Lab, Spinger-Verlag Berlin Heidelberg 2009.

Redact-It Overview, http://www.redact.com/overview, downloaded Feb. 10, 2012.

Rogers, G., "Googling Google: Google Gives Malware the Finger," ZDNet, CBS Interactive, Inc., Aug. 4, 2006, (retrieved Jun. 16, 2010), http://www.zdnet.com/blog/google/google-gives-malware-the-finger/283.

Stolfo, et al., "PARULEL: Parallel Rule Processing Using Meta-rules for Redaction," Department of Computer Science, Columbia University, New York, NY 10027, Jun. 25, 1991, pp. 1-47.

(56) References Cited

OTHER PUBLICATIONS

"Turn Desktop Alerts on or off," Microsoft Office Support, Outlook 2007, downloaded Apr. 26, 2012, http://office.microsoft.com/en-us/outlook-help/turn-desktop-alerts-on-or-off-HA010098670.aspx.
U.S. Department of Energy Office of Science, The Office of Science Graduate Fellowship Program, "Resources for Handling Transcripts," downloaded Sep. 30, 2012, http://scgf.orau.gov/transcripts-resources.html.
Wong, Alexander, et al., Department of Electrical and Computer Engineering University of Waterloo Waterloo, Ontario, Canada, "Expert Knowledge Based Automatic Regions-of-Interest (ROI) Selection in Scanned Documents for Digital Image Encryption," Proceedings of the 3rd Canadian Conference on Computer and Robot Vision (CRV'06).
ZyLAB, "Use Intelligent Redaction Tools to Secure Your Data", downloaded on Sep. 24, 2012.
U.S. Appl. No. 12/548,123_May 8, 2012_NonfinalRejection.
U.S. Appl. No. 12/548,123_Oct. 8, 2012_ResponseNonfinalRejection.
U.S. Appl. No. 12/548,123_Oct. 30, 2012_SupplementalResponse.
U.S. Appl. No. 12/559,720_Mar. 1, 2012_NonfinalRejection.
U.S. Appl. No. 12/559,720_Jun. 1, 2012_ResponseToNonfinalRejection.
U.S. Appl. No. 12/559,720_Aug. 27, 2012_FinalRejection.
U.S. Appl. No. 12/648,413_Sep. 27, 2012_NonfinalRejection.
Wong, A. et al , "Expert Knowledge Based Automatic Regions-of-Interst (ROU) Selection in Scanned Documents for Digital Image Encryption", dated 2006, Department of Electrical and Computer Engineering University of Waterloo, Ontario, Canada, Total 8 pages.
"Document Technology Systems Redaction Overview", Document Technology Systems, dated Apr. 28, 2006, (online) retrieved from the Internet at URL>http:www.dts-doc.com, Total 2 pages.
"Intellidact Intelligent Redaction Software", dated 2008, Computing Systems Innovations Inc., Total 2 pages.
Deguillaume, F. et al., "Protocols for Data-Hiding Based Text Document Security and Automatic Processing", dated Jul. 6, 2005, Downloaded on Sep. 22, 2009 from IEEE Xplore, Computer Science Department, CUI—University of Geneva,Total 12 pages.
International Search Report and Written Opinion, dated May 3, 2013, for International Application No. PCT/IB2013/050355, filed Jan. 15, 2013,Total 9 pages.
Final Office Action, Jul. 16, 2014, for U.S. Appl. No. 12/548,123, filed Aug. 26, 2009, entitled "Method for Detecting End Point of Plasma Etching and Plasma Etching Apparatus", invented by Joshua Fox et al., Total 14 pages.
Response to Final Office Action, dated Oct. 16, 2014. for U.S. Appl. No. 12/548,123, filed Aug. 26, 2009, entitled "Method for Detecting End Point of Plasma Etching and Plasma Etching Apparatus", invented by Joshua Fox et al., Total 11 pages.
Notice of Allowance, dated Oct. 14, 2014, for U.S. Appl. No. 12/559,720, filed Sep. 15, 2009, entitled, "Search Engine With Privacy Protection", invented by Joshua Fox et al., Total 8 pages.
Final Office Action, dated Aug. 28, 2014, for U.S. Appl. No. 12/648,413, filed Dec. 29, 2009,entitled, "Selecting Portions of Computer-Accessible Documents for Post-Selection Processing", invented by Joshua Fox et al., Total 36 pages.
Response to Office Action, dated Oct. 2, 2014, for U.S. Appl. No. 13/431,032, filed Mar. 27, 2012, entitled, "Selecting Portions of Computer-Accessible Documents for Post-Selection Processing", invented by Joshua Fox et al., Total 7 pages.
Response to Office Action, dated Jun. 9, 2014, for U.S. Appl. No. 13/350,794, filed Jan. 15, 2012, entitled "Automated Document Redaction", invented by Joshua Fox et al., Total 13 pgs.
Preliminary Remarks, dated Oct. 2, 2009, for U.S. Appl. No. 12/548,123, filed Aug. 26, 2009, entitled "Method for Detecting End Point of Plasma Etching and Plasma Etching Apparatus", invented by Joshua Fox et al., Total 3 pgs.
Office Action, dated May 8, 2012, for U.S. Appl. No. 12/548,123, filed Aug. 26, 2009, entitled "Method for Detecting End Point of Plasma Etching and Plasma Etching Apparatus", invented by Joshua Fox et al., Total 19 pgs.
Response to Office Action, dated Oct. 8, 2012, for U.S. Appl. No. 12/548,123, filed Aug. 26, 2009, entitled "Method For Detecting End Point of Plasma Etching and Plasma Etching Apparatus", invented by Joshua Fox et al., Total 14 pgs.
Supplemental Amendment, dated Oct. 30, 2012, for U.S. Appl. No. 12/548,123, filed Aug. 26, 2009, entitled "Method for Detecting End Point of Plasma Etching and Plasma Etching Apparatus", invented by Joshua Fox et al., Total 6 pgs.
Final Office Action, dated Jul. 5, 2013, for U.S. Appl. No. 12/548,123, filed Aug. 26, 2009, entitled "Method for Detecting End Point of Plasma Etching and Plasma Etching Apparatus", invented by Joshua Fox et al., Total 14 pgs.
Response to Final Office Action, dated Nov. 5, 2013, for U.S. Appl. No. 12/548,123, filed Aug. 26, 2009, entitled "Method for Detecting End Point of Plasma Etching and Plasma Etching Apparatus", invented by Joshua Fox et al., Total 11 pages.
OA3 dated Dec. 20, 2013, for U.S. Appl. No. 12/548,123, filed Aug. 26, 2009, entitled "Method for Detecting End Point of Plasma Etching and Plasma Etching Apparatus", invented by Joshua Fox et al., Total 13 pages.
Response to Office Action, dated Apr. 4, 2014, for U.S. Appl. No. 12/548,123, filed Aug. 26, 2009, entitled "Method for Detecting End Point of Plasma Etching and Plasma Etching Apparatus", invented by Joshua Fox et al., Total 4 pages.
Office Action, dated Mar. 1, 2012, for U.S. Appl. No. 12/559,720, filed Sep. 15, 2009, entitled, "Search Engine With Privacy Protection", invented by Joshua Fox et al., Total 32 pages.
Response to Office Action, dated May 9, 2012, for U.S. Appl. No. 12/559,720, filed Sep. 15, 2009, entitled, "Search Engine With Privacy Protection", invented by Joshua Fox et al., Total 8 pgs.
Supplemental Amendment, dated Jun. 1, 2012, for U.S. Appl. No. 12/559,720, filed Sep. 15, 2009, entitled, "Search Engine With Privacy Protection", invented by Joshua Fox et al., Total 19 pgs.
Final Office Action, dated Aug. 27, 2012, for U.S. Appl. No. 12/559,720, filed Sep. 15, 2009, entitled, "Search Engine With Privacy Protection", invented by Joshua Fox et al., Total 34 pages.
Response to Final Office Action, dated Dec. 27, 2012, for U.S. Appl. No. 12/559,720, filed Sep. 15, 2009, entitled, "Search Engine With Privacy Protection", invented by Joshua Fox et al., Total 21 pgs.
Notice of Allowance, dated Jun. 20, 2014, for U.S. Appl. No. 12/559,720, filed Sep. 15, 2009, entitled, "Search Engine With Privacy Protection", invented by Joshua Fox et al., Total 15 pages.
Preliminary Amendment, dated Mar. 27, 2012, for U.S. Appl. No. 12/648,413, filed Dec. 29, 2009,entitled, "Selecting Portions of Computer-Accessible Documents for Post-Selection Processing", invented by Joshua Fox et al., Total 6 pages.
Office Action, dated Sep. 27, 2012, for U.S. Appl. No. 12/648,413, filed Dec. 29, 2009,entitled, "Selecting Portions of Computer-Accessible Documents for Post-Selection Processing", invented by Joshua Fox et al., Total 19 pages.
Response to Office Action, dated Feb. 1, 2013, for U.S. Appl. No. 12/648,413, filed Dec. 29, 2009,entitled, "Selecting Portions of Computer-Accessible Documents for Post-Selection Processing", invented by Joshua Fox et al., Total 12 pages.
Final Office Action, dated Aug. 8, 2013, for U.S. Appl. No. 12/648,413, filed Dec. 29, 2009,entitled, "Selecting Portions of Computer-Accessible Documents for Post-Selection Processing", invented by Joshua Fox et al., Total 34 pages.
Response to Final Office Action, dated Nov. 8, 2013, for U.S. Appl. No. 12/648,413, filed Dec. 29, 2009,entitled, "Selecting Portions of Computer-Accessible Documents for Post-Selection Processing", invented by Joshua Fox et al., Total 15 pages.
Office Action, dated Dec. 5, 2013, for U.S. Appl. No. 12/648,413, filed Dec. 29, 2009,entitled, "Selecting Portions of Computer-Accessible Documents for Post-Selection Processing", invented by Joshua Fox et al., Total 37 pages.
Response to Office Action, dated Apr. 4, 2014, for U.S. Appl. No. 12/648,413, filed Dec. 29, 2009,entitled, "Selecting Portions of

(56) References Cited

OTHER PUBLICATIONS

Computer-Accessible Documents for Post-Selection Processing", invented by Joshua Fox et al., Total 14 pages.
Preliminary Amendment, dated Mar. 27, 2012, for U.S. Appl. No. 13/431,032, filed Mar. 27, 2012, entitled, "Selecting Portions of Computer-Accessible Documents for Post-Selection Processing", invented by Joshua Fox et al., Total 6 pages.
Office Action, dated Mar. 7, 2014, for U.S. Appl. No. 13/431,032, filed Mar. 27, 2012, entitled, "Selecting Portions of Computer-Accessible Documents for Post-Selection Processing", invented by Joshua Fox et al., Total 36 pages.
US Department of Energy Office of Science, The Office of Science Graduate Fellowship Program, "Resourses of Handling Transcripts", downloaded Sep. 30, 2012, http://scgf.orau.gov/transcripts-resources.html, Total 3 pages.
US Patent Application, dated Mar. 26, 2014, for U.S. Appl. No. 14/228,246, filed Mar. 26, 2014, entitled "Focused Personal Identifying Information Redaction", invented by Joshua Fox et al, Total 27 pages.
Damiani et al. A Fine-Grained Access Control System for XML Documents, dated May 2002, ACM transactions on Information and System Security, vol. 6, pp. 169-202, doc No. XP0026245587.
U.S. Appl. No. 12/559,720_Dec. 27, 2012_ResponseToFinalRejection(RCE).
U.S. Appl. No. 12/548,123_Jul. 5, 2013_FinalRejection.
U.S. Appl. No. 12/648,413_Aug. 8, 2013_FinalRejection.
Notice of Allowance, dated Jan. 30, 2015, for U.S. Appl. No. 12/559,720, filed Sep. 15, 2009, invented by Joshua Fox, Total 10 pages.
Final Office Action, dated Feb. 5, 2015, for U.S. Appl. No. 13/431,032, filed Mar. 27, 2012, invented by Joshua Fox, Total 20 pages.
Response to Final Office Action, dated Apr. 28, 2015, for U.S. Appl. No. 13/431,032, filed Mar. 27, 2012, invented by Joshua Fox, Total 9 pages.
Response to Final Office Action, dated Mar. 19, 2015, for U.S. Appl. No. 13/350,794, filed Jan. 15, 2012, invented by Joshua Fox, Total 12 pages.
International Preliminary Report on Patentability, dated Mar. 20, 2012, for International Application No. PCT/EP2010/062729, filed Aug. 31, 2010, Total 12 pages.
International Search Report, dated Mar. 24, 2011, for International Application No. PCT/EP2010/062729, filed Aug. 31, 2010, Total 6 pages.
Written Opinion of the International Searching Authority, dated Mar. 15, 2012, for International Application No. PCT/EP2010/062729, filed Aug. 31, 2010, Total 11 pages.
International Preliminary Report on Patentability, dated Jul. 15, 2014, for International Application No. PCT/IB2013/050355, filed Jan. 15, 2013, Total 5 pages.
Final Office Action, dated Nov. 7, 2014, for U.S. Appl. No. 12/548,123, filed Aug. 26, 2009, invented by Joshua Fox, Total 24 pages.
Response to Final Office Action, dated Jan. 27, 2015, for U.S. Appl. No. 12/548,123, filed Aug. 26, 2009, invented by Joshua Fox, Total 10 pages.
Restriction Requirement, dated Mar. 7, 2014, for U.S. Appl. No. 12/559,720, filed Sep. 15, 2009, invented by Joshua Fox, Total 6 pages.
Response to Restriction Requirement, dated May 8, 2014, for U.S. Appl. No. 12/559,720, filed Sep. 15, 2009, invented by Joshua Fox, Total 10 pages.
Supplemental Amendment, dated Sep. 25, 2014, for U.S. Appl. No. 12/559,720, filed Sep. 15, 2009, invented by Joshua Fox, Total 7 pages.
Supplemental Amendment, dated Oct. 14, 2014, for U.S. Appl. No. 12/559,720, filed Sep. 15, 2009, invented by Joshua Fox, Total 1 page.
Response to Final Office Action, dated Dec. 23, 2014, for U.S. Appl. No. 12/648,413, filed Dec. 29, 2009, invented by Joshua Fox, Total 12 pages.
Final Office Action, dated Dec. 19, 2014, for U.S. Appl. No. 13/350,794, filed Jan. 15, 2012, invented by Joshua Fox et al., Total 36 pages.
Office Action, dated Mar. 26, 2015, for U.S. Appl. No. 12/548,123, filed Aug. 26, 2009, invented by Joshua Fox, Total 15 pages.
Office Action, dated Apr. 10, 2015, for U.S. Appl. No. 12/648,413, filed Dec. 29, 2009, invented by Joshua Fox, Total 45 pages.
Notice of Allowance, dated Apr. 8, 2015, for U.S. Appl. No. 13/350,794, filed Jan. 15, 2012, invented by Joshua Fox, Total 13 pages.
C. Cumby et al., "A Machine Learning Based System for Semi-Automatically Redacting Documents", dated 2011, Proceedings of the Twenty-Third Innovative Applications of Artificial Intelligence Conference, Total 8 pages.
US Patent Application, dated Sep. 1, 2015, for U.S. Appl. No. 14/842,731, filed Sep. 1, 2015, invented by Joshua Fox, Total 38 pages.
Response to Office Action, dated Jun. 22, 2015, for U.S. Appl. No. 12/548,123, filed May 26, 2009, invented by Joshua Fox, Total 7 pages.
Final Office Action, dated Sep. 2, 2015, for U.S. Appl. No. 12/548,123, filed Aug. 26, 2019, invented by Joshua Fox, Total 14 pages.
Notice of Allowance, dated Jun. 19, 2015, for U.S. Appl. No. 12/559,720, filed Sep. 15, 2009, invented by Joshua Fox et al., Total 13 pages.
Office Action, dated Apr. 10, 2015, for U.S. Appl. No. 12/648,413, filed Dec. 29, 2009, invented by Joshua Fox et al., Total 45 pages.
Response to Office Action, dated Jul. 10, 2015, for U.S. Appl. No. 12/648,413, filed Dec. 29, 2009, invented by Joshua Fox, Total 14 pages.
Office Action, dated Jul. 22, 2015, for U.S. Appl. No. 13/431,032, filed Mar. 27, 2012, invented by Joshua Fox, Total 30 pages.
Notice of Allowance, dated Jul. 20, 2015, for U.S. Appl. No. 13/350,794, filed Jan. 15, 2012, invented by Joshua Fox, Total 14 pages.
Response to Office Action, datedOct. 22, 2015, for U.S. Appl. No. 13/431,032, filed Mar. 27, 2012, invented by Joshua Fox, Total 8 pages.
Final Office Action, dated Apr. 8, 2016, for U.S. Appl. No. 14/842,731, filed Sep. 1, 2015, invented by Joshua Fox, Total 16 pages.
Notice of Allowance, dated Mar. 29, 2016, for U.S. Appl. No. 12/648,413, filed Dec. 29, 2009, invented by Joshua Fox, Total 10 pages.
Response to Final Office Action, dated Dec. 2, 2015, for U.S. Appl. No. 12/548,123, filed Aug. 26, 2009, invented by Joshua Fox, Total 7 pages.
Office Action, dated Feb. 4, 2016, for U.S. Appl. No. 12/548,123, filed Aug. 26, 2009, invented by Joshua Fox, Total 14 pages.
Office Action, dated Nov. 20, 2015, for U.S. Appl. No. 14/842,731, filed Sep. 1, 2015, invented by Joshua Fox, Total 30 pages.
Response to Office Action, dated Feb. 22, 2016, for U.S. Appl. No. 14/842,731, filed Sep. 1, 2015, invented by Joshua Fox, Total 8 pages.
Final Office Action, dated Nov. 20, 2015, for U.S. Appl. No. 12/648,413, filed Dec. 29, 2009, invented by Joshua Fox, Total 49 pages.
Notice of Appeal, dated Feb. 19, 2016, for U.S. Appl. No. 12/648,413, filed Dec. 29, 2009, invented by Joshua Fox, Total 2 pages.
Pre-Appeal Brief Request for Review, dated Feb. 19, 2016, for U.S. Appl. No. 12/648,413, filed Dec. 29, 2009, invented by Joshua Fox, Total 6 pages.
Final Office Action, dated Feb. 3, 2016, for U.S. Appl. No. 13/431,032, filed Mar. 27, 2012, invented by Joshua Fox et al., Total 12 pages.
Final Office Action, dated Aug. 12, 2016, for U.S. Appl. No. 12/548,123, filed Aug. 26, 2009, invented by Joshua Fox, Total 16 pages.

(56) References Cited

OTHER PUBLICATIONS

Office Action, dated Aug. 25, 2016, for U.S. Appl. No. 14/842,731, filed Sep. 1, 2015, invented by Joshua Fox, Total 16 pages.
Response to Final Office Action, dated Nov. 11, 2016, for U.S. Appl. No. 12/548,123, filed Aug. 26, 2009, invented by Joshua Fox et. al, Total 9 pgs.
Office Action, dated Dec. 29, 2016, for U.S. Appl. No. 12/548,123, filed Aug. 26, 2009, invented by Joshua Fox et. al, Total 15 pgs.
Notice of Allowance, dated Nov. 16, 2016, for U.S. Appl. No. 12/648,413, filed Dec. 29, 2009, invented by Joshua Fox, Total 27 pages.
Notice of Allowance, dated Nov. 2, 2016, for U.S. Appl. No. 13/431,032, filed Mar. 27, 2012, invented by Joshua Fox et al., Total 23 pages.
Response to Office Action, dated May 4, 2016, for U.S. Appl. No. 12/548,123, filed Aug. 26, 2009, invented by Joshua Fox, Total 7 pages.
Response to Office Action, dated May 12, 2016, for U.S. Appl. No. 12/548,123, filed Aug. 26, 2009, invented by Joshua Fox, Total 6 pages.
Response to Final Office Action, dated Jun. 14, 2016, for U.S. Appl. No. 14/842,731, filed Sep. 1, 2015, invented by Joshua Fox, Total 9 pages.
Notice of Allowance, dated Jun. 15, 2016, for U.S. Appl. No. 13/431,032, filed Mar. 27, 2012, invented by Joshua Fox et al., Total 9 pages.
Response to Final Office Action, dated May 3, 2016, for U.S. Appl. No. 13/431,032, filed Mar. 27, 2012, invented by Joshua Fox et al., Total 9 pages.
Response to Final Office Action, dated Jan. 20, 2016, for U.S. Appl. No. 12/648,413, filed Dec. 29, 2009, invented by Joshua Fox, Total 14 pages.
Supplemental Amendment, dated Jun. 28, 2016, for U.S. Appl. No. 12/648,413, filed Dec. 29, 2009, invented by Joshua Fox, Total 7 pages.
U.S. Appl. No. 12/648,413_dated Feb. 1, 2013_ResponseNonfinalRejection.
PCT/IB2013/050355_dated May 3, 2013_InternationalSearchReportAndWrittenOpinion.
Office Action, dated Feb. 24, 2017, for U.S. Appl. No. 14/228,246, filed Mar. 26, 2014, invented by Shlomit Avrahami et al., Total 8 pages.
Response to Office Action, dated May 25, 2017, for U.S. Appl. No. 14/228,246, filed Mar. 26, 2014, invented by Shlomit Avrahami et al., Total 9 pages.
Notice of Allowance, dated Jun. 16, 2017, for U.S. Appl. No. 14/228,246, filed Mar. 26, 2014, invented by Shlomit Avrahami et al., Total 64 pages.
Response to Office Action, dated Dec. 27, 2016, for U.S. Appl. No. 14/842,731, filed Sep. 1, 2015, invented by Joshua Fox, Total 9 pages.
Final Office Action, dated Apr. 28, 2017, for U.S. Appl. No. 14/842,731, filed Sep. 1, 2015, invented by Joshua Fox, Total 16 pages.
Response to Final Office Action, dated Jun. 28, 2017, for U.S. Appl. No. 14/842,731, filed Sep. 1, 2015, invented by Joshua Fox, Total 8 pages.
Notice of Allowance, dated Jul. 19, 2017, for U.S. Appl. No. 14/842,731, filed Sep. 1, 2015, invented by Joshua Fox, Total 9 pages.
Corrected Notice of Allowability, dated Feb. 21, 2017 (Only initialed IDS) for U.S. Appl. No. 12/648,413 filed Dec. 29, 2009, invented by Joshua Fox, Total 14 pages .
Notice of Allowance, dated May 3, 2017, for U.S. Appl. No. 13/431,032, filed Mar. 27, 2012, invented by Joshua Fox et al., Total 20 pages.
Corrected Notice of Allowability, dated Jun. 12, 2017, for U.S. Appl. No. 13/431,032, filed Mar. 27, 2012, invented by Joshua Fox et al., Total 6 pages.

* cited by examiner

300

*Medical Report*

| Date | August 29, 2008 |
|---|---|
| Patient Name | Arthur Brown |
| Date of Birth | April 10, 1957 |
| Social Security Number | 078-05-1121 |
| Ref. No. | MR 2335/324 |
| Insurance provider | Aetna |

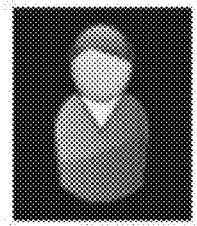

Image 923/A/74

*Background*

Mr. Arthur Brown was admitted to Sioux City General Hospital at 05:15 AM on 15 August 2008, transferred from Brookdale Psychiatric Hospital after a fall as a result of left-side weakness.

A pre-existing HIV positive condition was noted, with unclear relationship to the neurological condition.

He was started on antiepileptic medication Phenytoin and Mannitol for the edema.

Emily Juarez, his sister and next of kin, was contacted at tel. 312-275-3854 and consented to scientific organ donation.

*Outcome*

Brain Stem testing done on September 17 2008 showed absent brain stem functioning. Findings were consistent with brain death. He was referred to the coordinator of the Neurological Study at the University of South Dakota Medical Center for organ harvesting. Brain and upper spinal cord were harvested.

Dr. James Johnson, MD
Consulting Physician
Board-Certified Neurologist
Medical License 897238973

USD Medical Center
1223 King St.
Sioux Falls SD 57101
Tel. 605-335-3838
Mobile 605-941-9341

*Medical Report*

| Date | August 29, 2008 |
|---|---|
| Patient Name | ███████ |
| Date of Birth | ███████ |
| Social Security Number | ███████ |
| Ref. No. | MR 2335/324 |
| Insurance provider | Aetna |

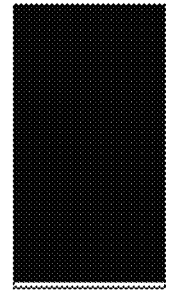

*Background*

Mr. ███████ was admitted to Sioux City General Hospital at 05:15 AM on 13 August 2008, transferred from Brookdale Psychiatric Hospital after a fall as a result of left-side weakness.

A pre-existing HIV positive condition was noted, with unclear relationship to the neurological condition.

He was started on antiepileptic medication Phenytoin and Mannitol for the edema.

Emily Juarez, his sister and next of kin, was contacted at tel. 312-275-2854 and consented to scientific organ donation.

*Outcome*

Brain Stem testing done on September 17 2008 showed absent brain stem functioning. Findings were consistent with brain death. He was referred to the coordinator of the Neurological Study at the University of South Dakota Medical Center for organ harvesting. Brain and upper spinal cord were harvested.

*[signature]*

Dr. James Johnson, MD
Consulting Physician
Board-Certified Neurologist
Medical License 897389/73

USD Medical Center
1223 King St.
Sioux Falls SD 57101
Tel. 605-335-3838
Mobile 605-941-9341

Fig. 3B

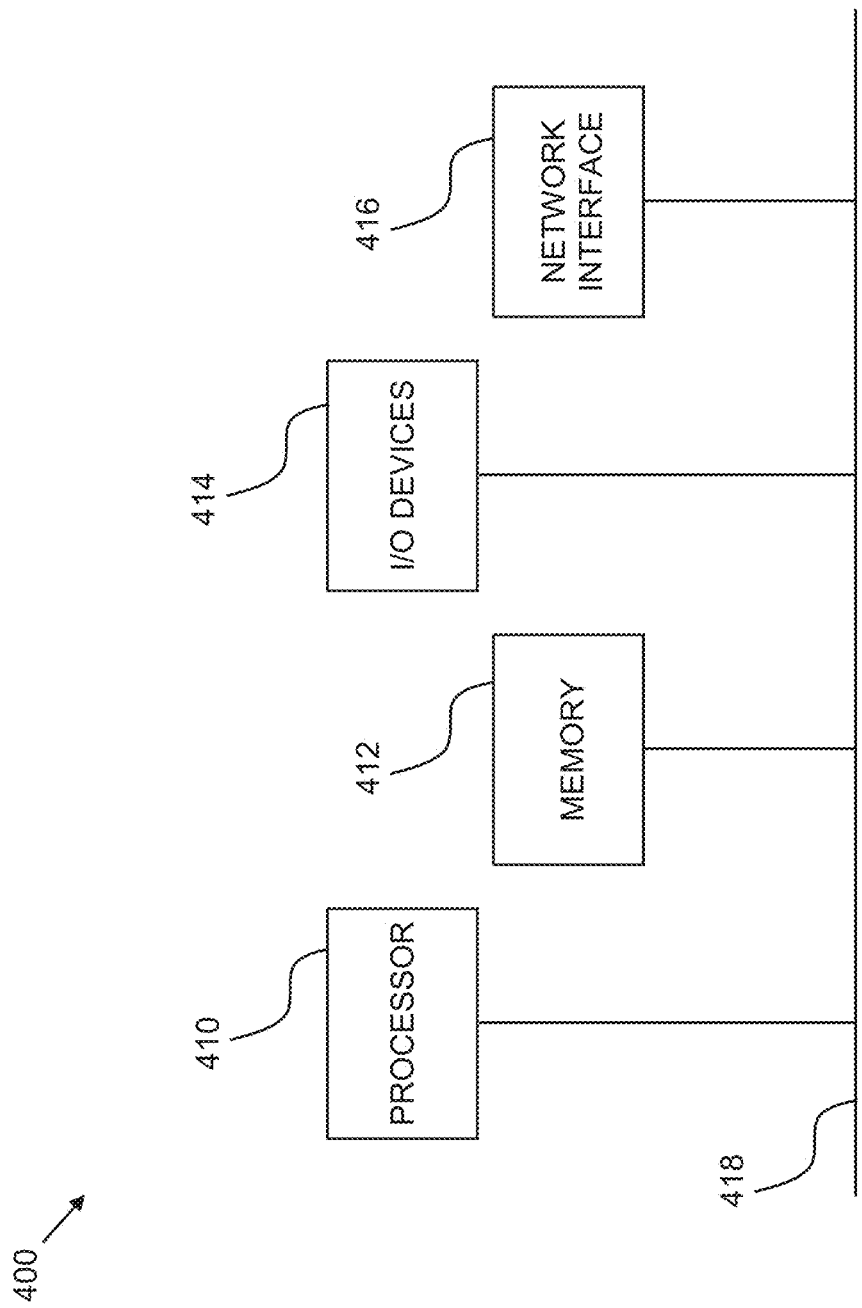

FOCUSED PERSONAL IDENTIFYING INFORMATION REDACTION

FIELD OF THE INVENTION

The invention relates to computer data access control and privacy in general, and more particularly to document redaction.

BACKGROUND OF THE INVENTION

Many organizations maintain documents that include information, such as of a medical or financial nature, that is deemed sensitive and whose exposure to individuals is restricted by company policy, or even by law. Such organizations may employ document redaction software that removes sensitive information from documents before they are shown to individuals requesting access to such documents. Document redaction software typically removes sensitive information from documents automatically according to a set of predefined rules that identify sensitive information within documents by using dictionaries of sensitive words, such as of given names and surnames, or by using visual characteristics, such as where a rule dictates that all 16-digit numbers that appear within a document be removed on the assumption that they are credit card numbers.

SUMMARY OF THE INVENTION

In one aspect of the invention a method is provided for redacting information in a first document by at least one computing processor retrieving personal information from at least one data source. At least one computing processor identifies personal information associated with a first individual. A second document is generated by at least one computing processor that is a version of the first document, wherein in the second document any of the personal information associated with the first individual cannot be discerned.

Systems and computer program products embodying the invention are also provided.

The term "document" as used herein refers to any data file that may be stored on a computer-readable data storage device, such as word processing files, database files, image files, and audio files.

BRIEF DESCRIPTION OF THE DRAWINGS

The invention will be understood and appreciated more fully from the following detailed description taken in conjunction with the appended drawings in which:

FIGS. 3A and 3B are simplified illustrations of an exemplary document illustrating aspects of the invention; and FIG. 4 is a simplified block diagram illustration of an exemplary hardware implementation of a computing system, constructed and operative in accordance with an embodiment of the invention.

DETAILED DESCRIPTION OF THE INVENTION

Figure 1:
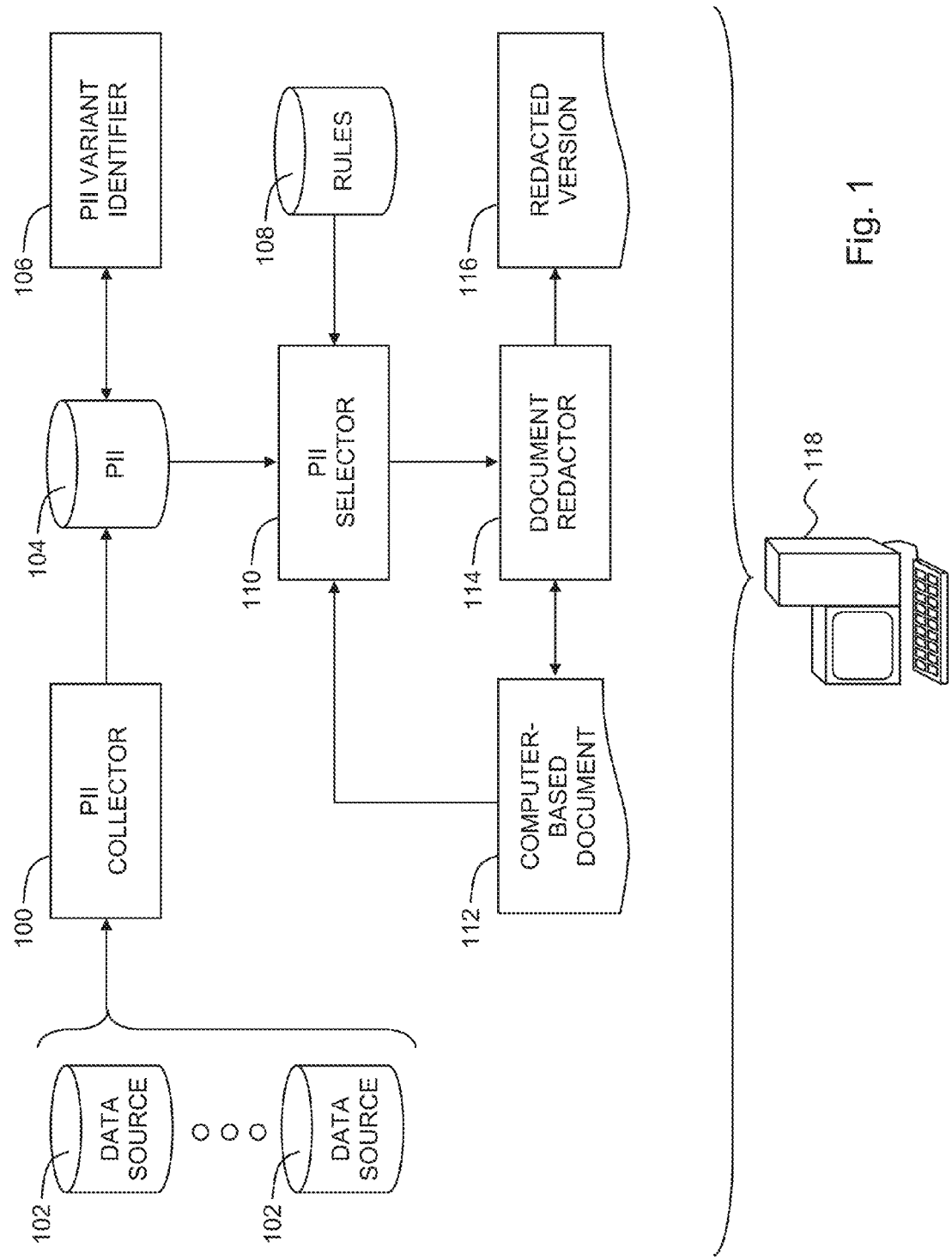
FIG. 1 is a simplified conceptual illustration of a document redaction system, constructed and operative in accordance with an embodiment of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A Computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a document redaction system, constructed and operative in accordance with an embodiment of the invention. In the system of FIG. 1, personally identifiable information (PII) identifier 100 is configured to identify PII 104 associated with a given individual, which preferably includes using one or more techniques that are unsuitable for manual implementation by a human. Initially, a certain limited amount of PII 104 is known to be associated with the individual. To identify additional PII 104 for the individual, identifier 100 is given the known, i.e., predetermined, PII 104. Based on the predetermined PII 104, identifier 100 locates and retrieves additional PII 104 for the individual from multiple data sources 102. By using multiple data sources and employing techniques described herein, identifier 100 increases the amount of PII 104 that is determined to be associated with the individual. This increase in PII 104 for the given individual ideally provides sufficient PII 104 for the given individual so that redaction merely by category may be avoided, wherein PII 104 of only the given individual may be redacted rather than entire information categories that are conventionally known and used independently of the given individual. Redacting based on categories of information rather than a large collection of PII 104 for the given individual would tend to redact PII 104 of other persons in addition to that of the given individual. That is, in embodiments of the present invention, PII 104 for the given individual, which is determined by searching multiple data sources for data about the individual and processing the potential data that is found, is increased to such a significant degree that it achieves a comprehensive threshold amount that is sufficient as the basis for redaction without resorting to conventional, generic category-based redaction. In some instances, the comprehensive threshold amount of PII 104 for the individual is sufficient partly due to being combined with rule-based selection disclosed herein of material in the document subjected to redaction. Identifying techniques that identifier 100 is configured to use preferably include entity analysis techniques such as:

Recognizing identities (entity resolution) to determine whether multiple records that appear to describe different individuals or organizations, even with different name variations, are actually records for a single resolved identity. This is done using, for example, name standardization (a data quality technique), address verification and correction (a data enhancement technique).

Detecting relationships which link entities. This can be done using shared attributes, such as telephone numbers and addresses, to uncover relevant, yet non-obvious relationships. Using these relationships, networks of associations and entities can be assembled using individual data attributes (such as identification numbers and names), locations (such as IP addresses), facilities, organizations, money, and accounts, thus identifying suspect or interesting relationships, even those that are hidden or disguised.

Software tools that may be used to carry out these techniques include IBM Identity Insight™, commercially available from International Business Machines Corporation, Armonk, N.Y.; NetOwl™, Text and Entity Analytics for Big Data, commercially available from SRA International, Inc., Fairfax, Va.; and Rosette Entity Extractor™, commercially available from Basis Technology Corporation, Cambridge, Mass.

The term "PII" includes not only "personally identifiable information" as stated herein above, but also the variants "personal identifying information," "personally identifying information," and "personal identifiable information." In general usage, PII may have a variety of meanings, at least some of which are legally significant meanings that may vary from jurisdiction to jurisdiction. Although the technology disclosed herein may have applications to matters governed by privacy law, the present disclosure relates more generally to technology for information redaction. Consequently, the term "PII" is used broadly herein as a technical term generally referring to information that at least tends to indicate a person's identity, particularly in combination with other information that tends to indicate a person's identity. In some instances, certain information such as a social security number may uniquely indicate a person's identity all by itself, without additional information. In other instances, one item of information may contribute to indicating a person's identity, but more than one item may be needed to uniquely indicate their identity, such as a name combined with an address. "PII" herein refers to information which may at least contribute to someone being located, contacted, or personally identified, hence "personally identifiable" information. Exactly what constitutes PII for a particular embodiment of the invention is preferably predefined prior to identifier 100 locating and retrieving additional PII 104 for the given individual. For example, if a given individual is named "Arthur Brown," PII 104 associated with the individual may include, among other information, Social Security Number ("SSN"): xxx-xx-xxxx
Date of Birth: August 23, 1960
Address: 52 Adam Street, Somewhere CA 91975
Telephone Number: xxx-xxx-xxxx where x represents numbers, of course, which are not provided in this example merely to avoid any unintended similarity to identifying information of a real person. Regarding the information in examples herein, including text and figures, the information depicts a fictional person or persons. Any similarity of the example information to information about real persons is unintended.

As to the matter of multiple data sources or records previously mentioned, PII 104 may, for example, be gathered from one or more database records in one or more databases, where given a data item associated with the given individual, additional data associated with the given individual may be retrieved from database records that contain the data item. For example, given the name "Arthur Brown" as initially predetermined PII 104 for the given individual, a database record containing the name "Arthur Brown" might also contain his birth date, in which case identifier 100 will gather the birth date from the database record. In another example, given the name "Arthur Brown" as initially predetermined PII 104 for the given individual, a first database record containing the name "Arthur Brown" might also contain his telephone number, in which case identifier 100 will gather the telephone number from the first database record. Also, identifier 100 may then use the telephone number found in the first data source for Arthur Brown as a linking basis to find additional PII 104 for Arthur Brown in another data source (e.g., another record in the same database, information in another data source, such as another record in another database or information in another unstructured data source, etc.) For example, the telephone number for Arthur Brown may appear in a second data source, which may even be without a clear association to Arthur Brown's name. Identifier 100 may use the telephone number from the first data source to find additional PII 104 for Arthur Brown that is associated with the telephone number in the second data source.

Additionally or alternatively, the PII 104 may, for example, be gathered from scan images of paper documents, such as forms, using predefined templates that indicate where data items such as names and telephone numbers and other fields are found on a form, as well as indicating other visual features that are unique to a given form in order to distinguish between different types of forms.

Additionally or alternatively, the PII 104 may, for example, be in the form of graphical elements that are associated with the given individual, such as in the form of photographs of the individual. For example, facial recognition techniques may be used to identify photographs of a given individual given an initial photograph of the individual.

The PII 104 identified by PII identifier 100 is shown in FIG. 1 as PII 104.

A PII variant identifier 106 is configured to determine, in accordance with conventional techniques, one or more variants of PII 104, and add the variants to PII 104. For example, one or more variants may be determined for the name "Arthur Brown, Jr.", such as "Brown, Arthur, Junior"
"Arthur Brown, Junior"
"Artie Brown"

Similarly, one or more variants may be determined for an address in the state of California, the city of Lakeside, on 52 Adam Street, such as "52 Adam Street, Somewhere, CA, 91975"
"52 Adam St., Somewhere, California"

Likewise, one or more variants may be determined for the date "Aug. 23, 1960", such as "August 23, 1960"
"8/23/1960"
"8-Aug-1960"

One or more rules 108 are preferably defined for determining when any of PII 104 is to be selected for redaction when PII 104 is found within a computer-readable document. Rules 108 may be defined by coding them as data and instructions in a programming language and storing them in a computer-readable storage device. For example, a dictionary or word list may be created from PII 104. A rule may, for example, be defined whereby any entry in the dictionary or word list that is found within a computer-readable document should be selected for redaction. Similarly, a rule may, for example, be defined whereby any entry in the dictionary or word list that is found within a computer-readable document should be selected for redaction only if another entry in the dictionary or word list is also nearby within the same document, e.g., within a predefined number of words, such as twenty. Similarly, a rule may, for example, be defined whereby semantic-category recognition algorithms are used to match a telephone number in the dictionary or word list with a string of digits that is found within a computer-readable document, whereupon the string of digits is selected for redaction, if a) the digits match the telephone number's digits and b1) if the string of digits is proximate to the word "Tel." or "Phone," or b2) if the string of digits matches a predefined pattern associated with telephone numbers, such as "nnn-nnn-nnnn," "(nnn) nnn nnnn," "+n-nnn-nnnnnnn" Rules 108 may include defined similarity thresholds that may be used to select for redaction any entry in the dictionary or word list that is found within the computer-readable document in accordance with one or more rules, but in a misspelled form.

A PII selector 110 is configured to read PII 104 and process a computer-readable document 112 (or information therefrom) for locating in document 112 any of PII 104, and select the located PII 104 for redaction, preferably through application of any of the aforementioned rules 108 to computer-readable document 112 or information therefrom. PII selector 110 may evaluate rules 108 using System T™, commercially available from International Business Machines Corporation, Armonk, N.Y., or similar software. It is appreciated that the computer-readable document 112 selected for processing by PII selector 110 may include both PII 104 that is associated with the given individual, as well as PII 104 that is associated with one or more other individuals. Where computer-readable document 112 includes both PII 104 that is associated with the given individual and PII 104 that is associated with one or more other individuals, PII 104 of the different individuals may also share one or more data types, such as names, telephone numbers, and addresses.

A document redactor 114 is configured to create a redacted version of the computer-readable document 112 in which any of the PII 104 selected for redaction by PII selector 110 cannot be discerned. This may, for example, be achieved by altering computer-readable document 112 by removing from computer-readable document 112 any of the PII 104 selected for redaction, or by otherwise causing any of the PII 104 selected for redaction to be unreadable or otherwise unrecognizable within computer-readable document 112. Alternatively, this may be achieved by creating a copy 116 of computer-readable document 112 in which any of the PII 104 selected for redaction is omitted or rendered unreadable or otherwise unrecognizable. Where, before it is processed by document redactor 114, computer-readable document 112 includes both PII 104 that is associated with the given individual and PII 104 that is associated with one or more other individuals, the redacted version of the computer-readable document 112 created by document redactor 114 preferably retains PII 104 that is associated with the one or more other individuals.

Any of the elements shown in FIG. 1 are preferably implemented by, are embodied within, or are otherwise accessible to, a computer 118, such as by implementing any of the elements in computer hardware and/or in computer software embodied in a computer-readable storage medium in accordance with conventional techniques.

Figure 2:
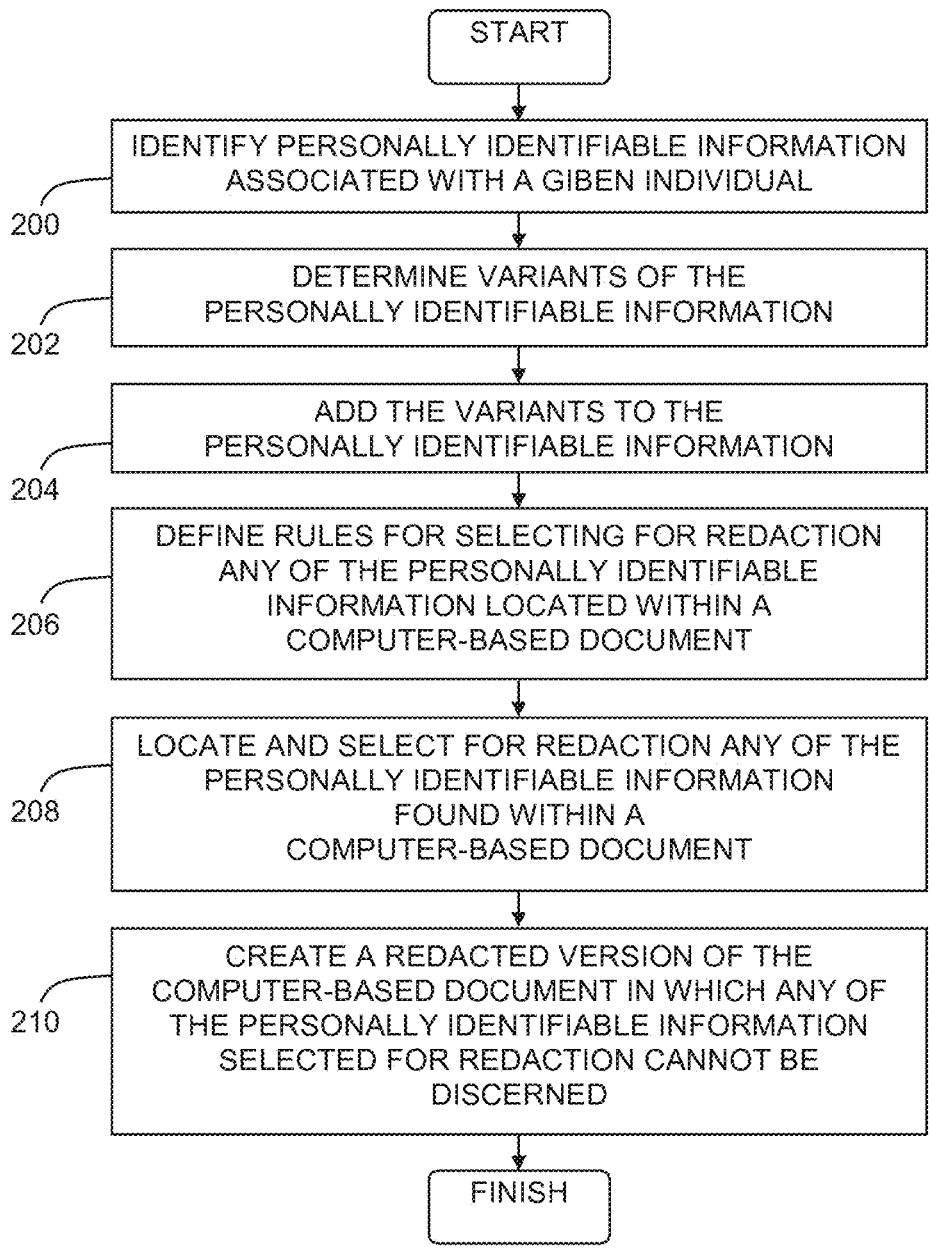
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2, personally identifiable information (PII) associated with a given individual is identified (step 200), preferably where the PII is identified by one or more computers using one or more techniques that are unsuitable for manual implementation by a human, and where the PII is retrieved from multiple data sources.

Note that if, in searching for PII in step 200 or similar step, resource consumption (e.g., CPU cycle) might be excessive, then the searching may be bounded as follows in one or more embodiments of the invention: In each time unit (e.g., minute), the ration n/R is calculated, where n is the number of new PII items and R is the resource consumption in that time period. If the ration n/R drops below a certain pre-configured value (which is configured in accordance with the perceived value of high accuracy in finding and redacting PII), then the search is stopped and the system proceeds to the next phase as described below.

One or more variants of the identified PII may optionally be determined (step 202) in accordance with conventional techniques, and the variants added to the PII associated with the given individual (step 204). One or more rules are preferably defined for determining when any of the PII associated with the given individual is to be selected for redaction when the PII is found within a computer-readable document (step 206). Any of the PII associated with the given individual is located within a computer-readable document and selected for redaction (step 208), preferably through application of any of the aforementioned rules. A redacted version of the computer-readable document is created in which any of the PII selected for redaction cannot be discerned (step 210). This may, for example, be achieved by altering the computer-readable document by removing from the document any of the PII selected for redaction, or by otherwise causing any of the PII selected for redaction to be unreadable or otherwise unrecognizable within the document. Alternatively, this may be achieved by creating a copy of the original computer-readable document in which any of the PII selected for redaction is omitted or rendered unreadable or otherwise unrecognizable.

It will be appreciated that the invention disclosed herein enables PII associated with a given individual to be located within a computer-readable document and selected for redaction, while PII of other individuals is not selected for redaction. A redacted version of the document is then created in which only the PII associated with the given individual and selected for redaction is not discernible.

Reference is now made to FIGS. 3A and 3B, which are simplified illustrations of an exemplary document illustrating aspects of the invention. In FIG. 3A a document 300 of a patient's medical information is shown. The system and method of FIGS. 1 and 2 may be employed to prepare a redacted version of document 300, such as for use by medical researchers. Taking a specific example, consider a hospital record, such as a document, that is sent to a researcher. The PII of the patient is to be redacted from the document, but not PII of other people mentioned, such as physicians and staff. In FIG. 3B a redacted version 302 is shown in which PII relating to the patient is not discernible, while PII relating to other individuals as seen in document 300 is retained within redacted version 302.

Referring now to FIG. 4, block diagram 400 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on computer-readable storage media, such as magnetic or optical storage media, or embedded within computer hardware, and may be executed by or otherwise accessible to a computer.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system comprising:
   at least one computing processor; and
   a computer-readable storage media connected to the at least one computing processor, wherein the computer-readable storage media has stored thereon an information redacting program for controlling the at least one computing processor, and wherein the at least one computing processor is operative with the program to execute the program to:
   in response to a start of operations to redact information, identify personally identifiable information for an individual by searching multiple data sources for personal information about the individual, wherein the personal information includes at least one of location, contacts, and other personally identifiable information for the individual;
   determining whether a resource consumption ratio satisfies a pre-configured value while identifying personally identifiable information for the individual; and
   in response to determining that the resource consumption ratio satisfies the pre-configured value, stopping the at least one computing processor from continuing to identify the personally identifiable information and proceed to generate a second document from a first document wherein the personally identifiable information within the first document is redacted from the second document.

2. The system according to claim 1, wherein the at least one computing processor is further operative with the program to execute the program to:
   determine a variant of any of the personally identifiable information associated with the individual, and
   include the variant in the personally identifiable information associated with the individual.

3. The system according to claim 1, wherein the identify personally identifiable information comprises identifying by an entity analysis technique.

4. The system according to claim 1, wherein the at least one computing processor is further operative with the program to execute the program to locate within the first document any of the personally identifiable information associated with the individual.

5. The system according to claim 1, wherein the individual comprises a first individual, wherein generating the second document comprises retaining within the second document personally identifiable information associated with a second individual.

6. The system according to claim 1, wherein the individual comprises a first individual, wherein the first document includes the personally identifiable information associated with the first individual and personally identifiable information associated with a second individual, wherein the personally identifiable information associated with the first individual shares at least one data type with the personally identifiable information associated with the second individual.

7. The system of claim 1, wherein the searching the multiple data sources comprises gathering personally identifiable information for the individual from database records in a plurality of databases.

8. A computer program product for redacting individual-related information in a first computer-readable document, the computer program product comprising:
   a non-transitory computer-readable storage medium; and
   computer-readable program code embodied in the non-transitory computer-readable storage medium, wherein the computer-readable program code is configured to cause at least one computing processor to:
   in response to a start of operations to redact information, identify personally identifiable information for an individual by searching multiple data sources for personal information about the individual, wherein the personal information includes at least one of location, contacts, and other personally identifiable information for the individual;
   determining whether a resource consumption ratio satisfies a pre-configured value while identifying personally identifiable information for the individual; and
   in response to determining that the resource consumption ratio satisfies the pre-configured value, stopping the at least one computing processor from continuing to identify the personally identifiable information and proceed to generate a second document from a first document wherein the personally identifiable information within the first document is redacted from the second document.

9. The computer program product according to claim 8 wherein the computer-readable program code is configured to cause the at least one computing processor to:
   determine a variant of any of the personal information associated with the individual, and
   include the variant in the personally identifiable information associated with the individual.

10. The computer program product according to claim 8 wherein the identify the personally identifiable information comprises identifying by an entity analysis technique.

11. The computer program product according to claim 8 wherein the computer-readable program code is configured to cause the at least one computing processor to locate within the first document any of the personally identifiable information associated with the individual.

12. The computer program product according to claim 8, wherein the individual comprises a first individual, wherein the computer-readable program code is configured to cause the at least one computing processor to retain within the second document personally identifiable information associated with a second individual.

13. The computer program product according to claim 8, wherein the individual comprises a first individual, wherein the first document includes the personally identifiable information associated with the first individual and personally identifiable information associated with a second individual, wherein the personally identifiable information associated with the first individual shares at least one data type with the personally identifiable information associated with the second individual.

14. The computer program product of claim 8, wherein the identifying the personally identifiable information comprises:

using personally identifiable information from one of the data sources as a linking basis to find additional personally identifiable information for the individual in another of the data sources.

15. The computer program product of claim 8, wherein the searching the multiple data sources comprises gathering personally identifiable information for the individual from database records in a plurality of databases.

\* \* \* \* \*